(12) United States Patent
Dohr et al.

(10) Patent No.: US 12,502,705 B2
(45) Date of Patent: *Dec. 23, 2025

(54) DEVICE AND METHOD FOR CONTINUOUSLY PRODUCING AN AT LEAST PARTLY HOLLOW SHAFT HAVING A VARYING INNER AND/OR OUTER DIAMETER

(71) Applicant: MAGNA Powertrain GmbH & Co KG, Lannach (AT)

(72) Inventors: Ewald Dohr, St. Michael (AT); Helmut Haas, St. Peter a. Ottersbach (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 316 days.

This patent is subject to a terminal disclaimer.

(21) Appl. No.: 18/285,534

(22) PCT Filed: Feb. 22, 2022

(86) PCT No.: PCT/EP2022/054413
§ 371 (c)(1),
(2) Date: Oct. 4, 2023

(87) PCT Pub. No.: WO2022/214233
PCT Pub. Date: Oct. 13, 2022

(65) Prior Publication Data
US 2024/0181515 A1      Jun. 6, 2024

(30) Foreign Application Priority Data

Apr. 6, 2021   (DE) ...................... 10 2021 203 376.8

(51) Int. Cl.
*B21J 7/14*          (2006.01)
*B21C 37/16*      (2006.01)
(Continued)

(52) U.S. Cl.
CPC .................. *B21J 7/14* (2013.01); *B21C 37/16* (2013.01); *B21D 31/06* (2013.01); *B21J 5/06* (2013.01);
(Continued)

(58) Field of Classification Search
CPC ........ B21C 37/16; B21D 31/06; B21D 43/05; B21D 51/16; B21J 5/06; B21J 7/12;
(Continued)

(56) References Cited

U.S. PATENT DOCUMENTS

2016/0030989 A1* 2/2016 Pichler .................. B21K 1/066
72/57

FOREIGN PATENT DOCUMENTS

DE          768149 C       7/1958
DE       2448283 A1       6/1975
(Continued)

OTHER PUBLICATIONS

European Patent Office, Rijswijk, Netherlands, International Search Report of International Application No. PCT/EP2022/054413, Mailed Jun. 14, 2022, 2 pages.

*Primary Examiner* — Jared O Brown
(74) *Attorney, Agent, or Firm* — Dickinson Wright PLLC

(57) ABSTRACT

A device and method for continuously producing an at least partly hollow shaft having a varying inner diameter includes forging tools that are arranged centrally symmetrically about a forging axis and are driven radially, a clamping chuck for holding an at least partly hollow cylindrical blank, and a counter-holder for axially supporting the blank. The counter-holder has a base and a counter-holder mandrel arranged on the base and extending axially into a central cavity in the blank. The mandrel is formed of at least two parts, wherein a first part of the counter-holder mandrel constitutes an inner part and a second part of the counter-holder mandrel con-
(Continued)

stitutes an outer part surrounding the inner part. At least the outer part can be moved axially relative to the inner part.

20 Claims, 10 Drawing Sheets

(51) Int. Cl.
  *B21D 31/06* (2006.01)
  *B21J 5/06* (2006.01)
  *B21J 7/16* (2006.01)
  *B21K 1/12* (2006.01)
  *B21D 43/05* (2006.01)
  *B21D 51/16* (2006.01)
  *B21J 13/04* (2006.01)

(52) U.S. Cl.
  CPC .................. *B21J 7/16* (2013.01); *B21K 1/12* (2013.01); *B21D 43/05* (2013.01); *B21D 51/16* (2013.01); *B21J 13/04* (2013.01)

(58) Field of Classification Search
  CPC ....... B21J 7/14; B21J 7/145; B21J 7/16; B21J 13/04; B21K 1/063; B21K 1/12; B21K 21/08
  See application file for complete search history.

(56) References Cited

FOREIGN PATENT DOCUMENTS

| | | |
|---|---|---|
| DE | 19523280 A1 | 1/1997 |
| EP | 2964407 A1 | 1/2016 |
| GB | 1001755 A | 8/1965 |
| WO | 2014134651 A1 | 9/2014 |

\* cited by examiner

DEVICE AND METHOD FOR CONTINUOUSLY PRODUCING AN AT LEAST PARTLY HOLLOW SHAFT HAVING A VARYING INNER AND/OR OUTER DIAMETER

CROSS-REFERENCE TO RELATED APPLICATIONS

This application is a National Stage of International Application No. PCT/EP2022/054413, filed Feb. 22, 2022, which claims priority to DE 10 2021 203 376.8, filed Apr. 6, 2021. The entire disclosures of each of the above applications are incorporated herein by reference.

FIELD

The present invention relates to a device for the continuous production of an at least partially hollow shaft with a varying internal and/or external diameter, said device comprising at least two forging tools, which are arranged centrally symmetrically about a forging axis and can be driven in the sense of radial working strokes, a clamping head for holding an at least partially hollow cylindrical blank, and a counterholder for axially supporting the blank, wherein the counterholder has a base and a counterholder mandrel, which is placed on the base and extends axially into a central cavity in the blank, wherein the counterholder mandrel is designed in at least two parts, wherein a first part of the counterholder mandrel is an internal part and a second part of the counterholder mandrel is an external part that surrounds the internal part, wherein at least the external part is designed to be able to move axially relative to the internal part, and to a method for the continuous production of an at least partially hollow shaft with a varying internal and/or external diameter utilizing such a device.

BACKGROUND

This section provides information related to the present disclosure which is not necessarily prior art.

In the technical field of mechanical engineering, in particular automotive technology, shafts and axles are key elements. For the purposes of reducing weight and saving resources, shafts and axles are increasingly being produced from hollow material, for example from tube blanks as an inexpensive primary material. For example, radial forging methods are used to shape the blanks. Multi-stage shaping, that is to say shaping a blank with different internal and/or external diameters, generally requires a blank to be re-clamped in separate component-clamping setups, which leads to an increased handling outlay, longer cycle times and, as a result, higher costs as well.

SUMMARY

This section provides a general summary of the disclosure, and is not a comprehensive disclosure of its full scope or all of its features.

One object of the present disclosure is to provide a structurally simple device that makes continuous production of a shaft with a varying internal and/or external diameter possible in a simple manner. Another object of the present disclosure is to provide an improved method for the continuous production of a shaft with a varying internal and/or external diameter utilizing a device according to the present disclosure.

These requirements can be met by the subject matter of the present disclosure. Advantageous embodiments of the present disclosure are further described herein.

The device according to the present disclosure is used for the continuous production of an at least partially hollow shaft with a varying internal and/or external diameter.

According to the present disclosure, the device comprises at least two forging tools, which are arranged centrally symmetrically about a forging axis and can be driven in the sense of radial working strokes, a clamping head for holding an at least partially hollow cylindrical blank, and a counterholder for axially supporting the blank, wherein the counterholder has a base and a counterholder mandrel, which is placed on the base and extends axially into a central cavity in the blank.

In accordance with the present disclosure, the counterholder mandrel is designed in at least two parts, wherein a first part of the counterholder mandrel is an internal part and a second part of the counterholder mandrel is an external part that surrounds the internal part, wherein at least the external part is designed to be able to move axially relative to the internal part.

The internal part thus has a smaller external diameter than the external part. The external part thus has a larger external diameter than the internal part.

In this context, the directional indication "axially" is understood to mean a direction along or parallel to the forging axis. In this context, the directional indication "radially" is understood to mean a direction normal to the forging axis.

The counterholder and/or the clamping head and/or the forging tools can be movable axially along a guide bed.

The counterholder mandrel of the counterholder preferably has a larger axial extent than the central cavity in the blank. That is to say, the counterholder mandrel is longer than the central cavity.

The method according to the present disclosure for the production of an at least partially hollow shaft with different internal and/or external diameters takes place using the device according to the present disclosure and comprises at least the following steps:

providing a cylindrical blank with a through-bore, which at least partially penetrates into said blank and forms a central cavity in the blank, clamping the blank in a clamping head such that an opening of the central cavity is located on an end side of the blank facing away from the clamping head, axially moving the clamping head with the clamped blank toward a first position of the blank, axially advancing a counterholder or axially moving the clamping head such that a counterholder mandrel, specifically an internal part and an external part of the counterholder mandrel, completely axially penetrates into the central cavity in the blank as far as a defined stop, wherein the blank is preloaded by way of the external part, radially advancing the forging tools toward a first portion of the blank, forging a first shaft portion with a first internal diameter in the region of the first portion of the blank, wherein the first internal diameter is defined by an external diameter of the external part, radially opening the forging tools, axially moving the external part out of the central cavity in the blank in the direction toward the base of the counterholder, wherein an end side of the blank is preloaded by way of the external part, axially moving the clamping head with the clamped blank toward a second position of the blank such that the internal part is located in the region of a second portion and only partially penetrates into the cavity, radially advancing the forging tools toward the second portion of the blank, forging a second shaft portion with a second internal diameter in the region of the second portion of the blank, wherein the second internal diameter is defined by an external diameter of the internal part, radially opening the forging tools, axially moving the internal part out of the central cavity in the blank in the direction toward the base of the counterholder, wherein an end side of the blank is released by way of the external part, axially removing the blank, now the finished shaft, from the clamping head.

The design, which has been improved according to the present disclosure, of the device makes it possible to achieve a radial forging method that is in particular distinguished by a low handling outlay, shorter cycle times and, as a result, lower costs as well.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

DETAILED DESCRIPTION

Figure 1:
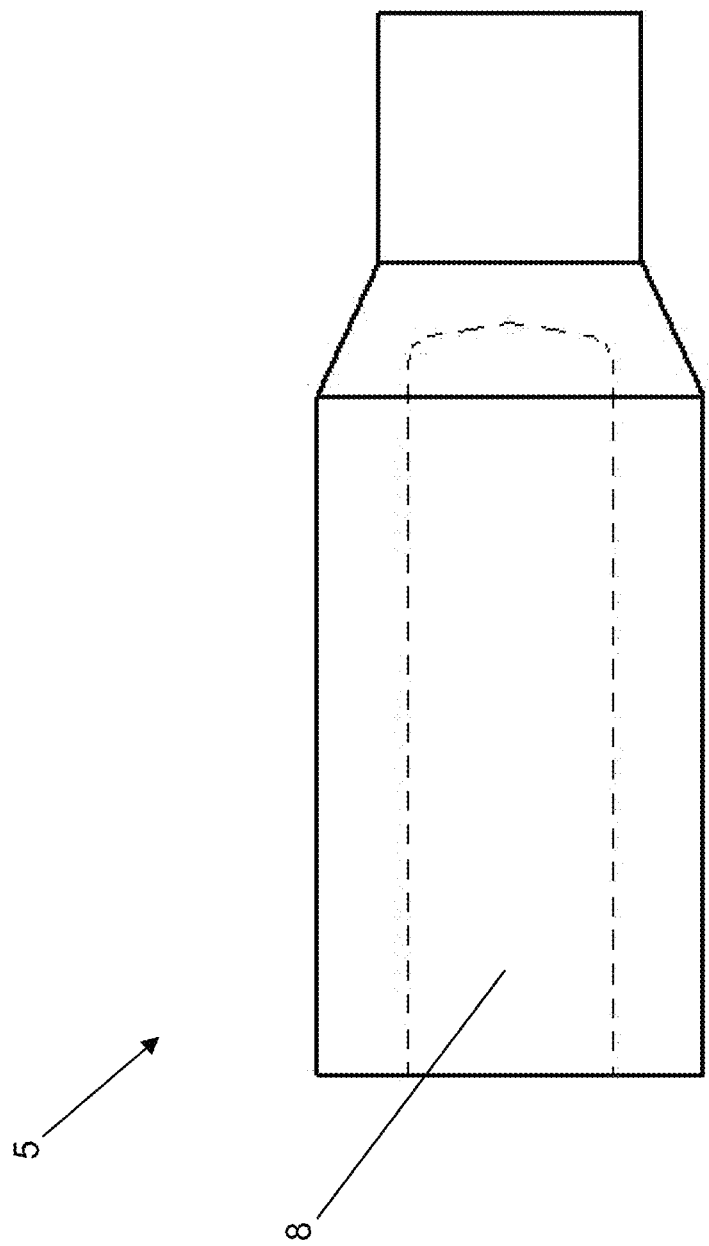
FIG. 1 shows a schematic illustration of an exemplary blank prior to a forging operation.
Figure 2:
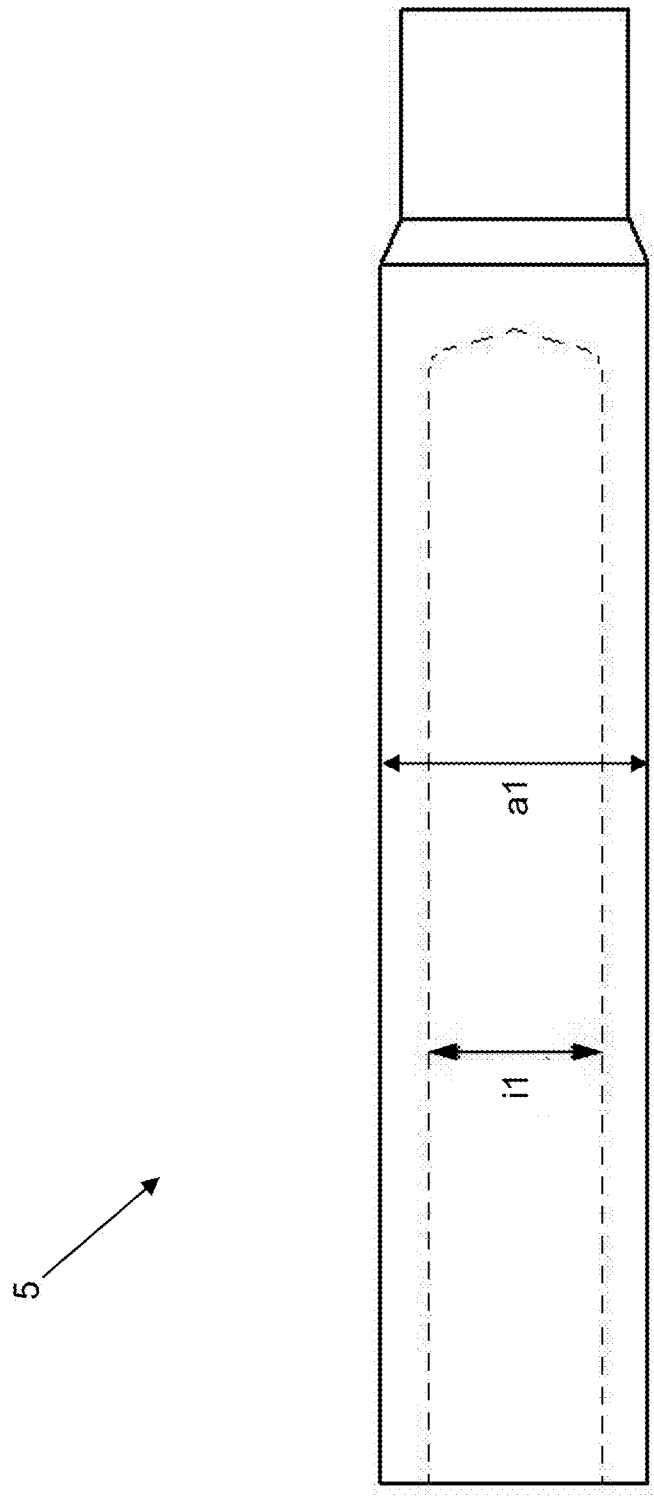
FIG. 2 shows a schematic illustration of the exemplary blank after a first forging operation with a first internal diameter and a first external diameter.
Figure 3:
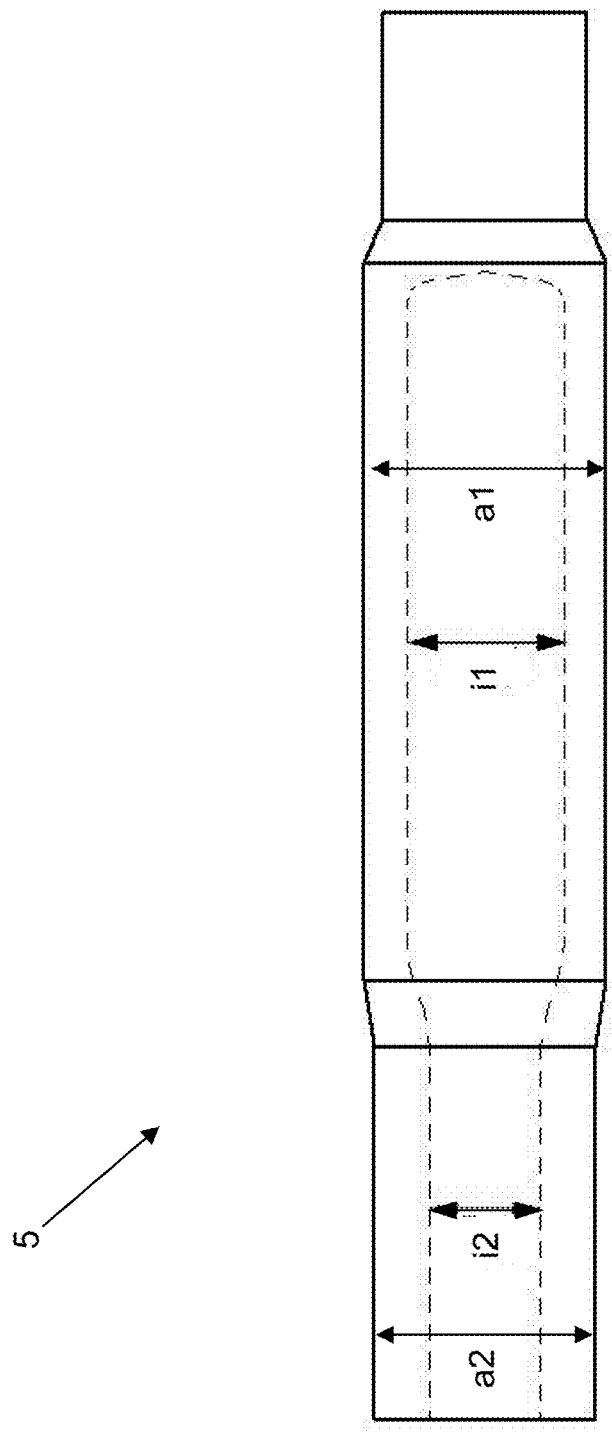
FIG. 3 shows a schematic illustration of a finished shaft after a first and a second forging operation.
Figure 4:
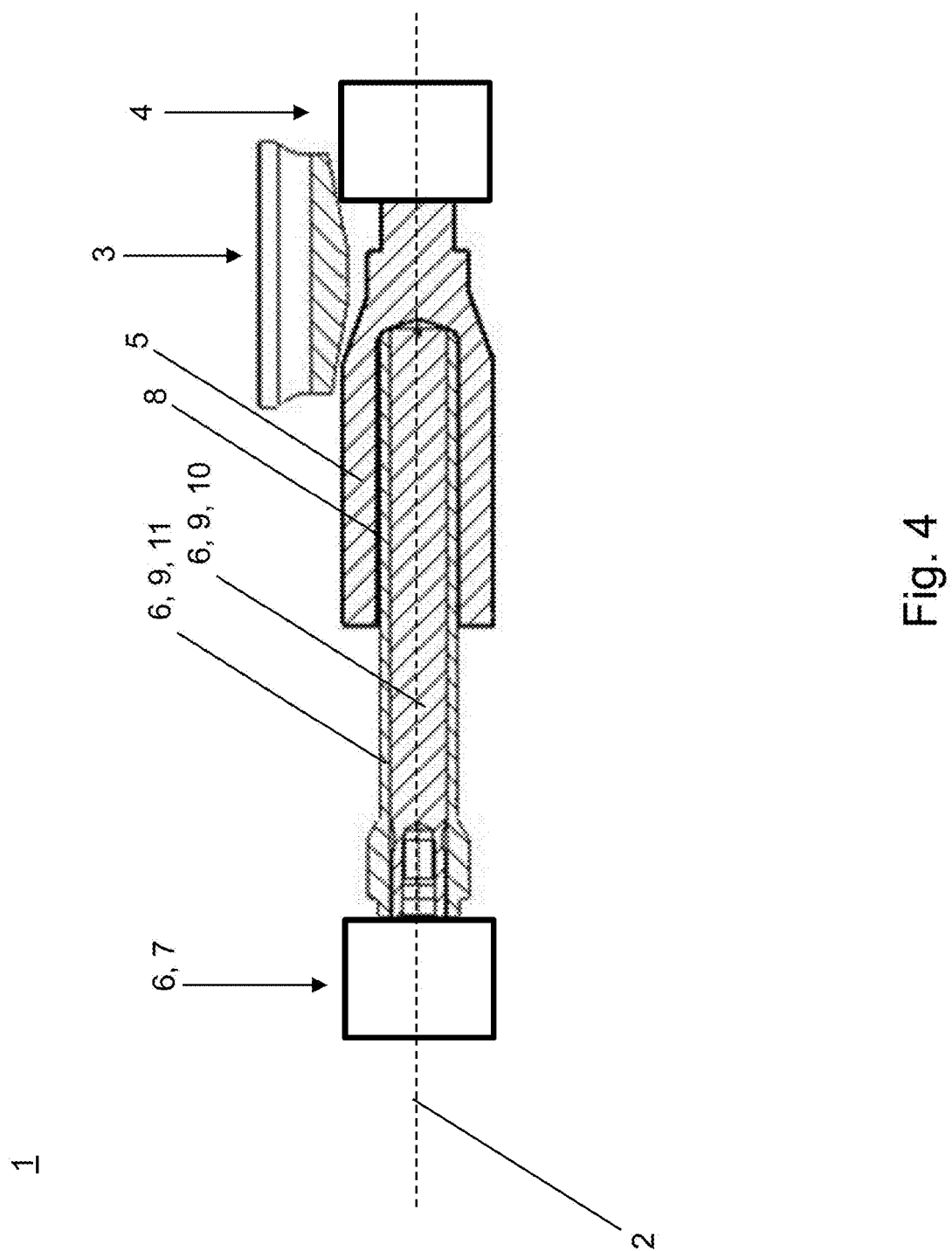
FIG. 4 shows a schematic sectional view of a device in a starting position.
Figure 5:
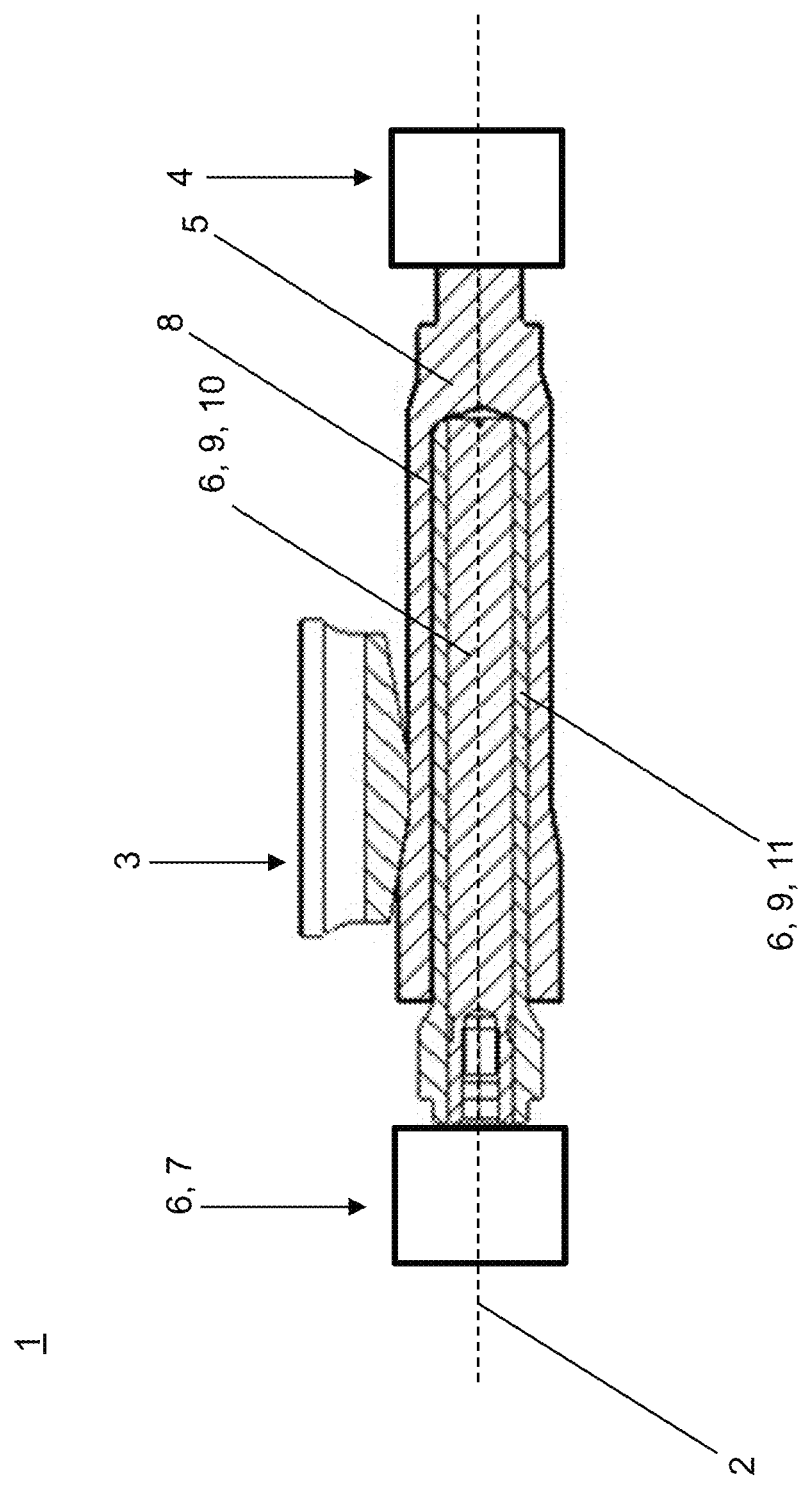
FIG. 5 shows a schematic sectional view of the device during a first forging operation.
Figure 6:
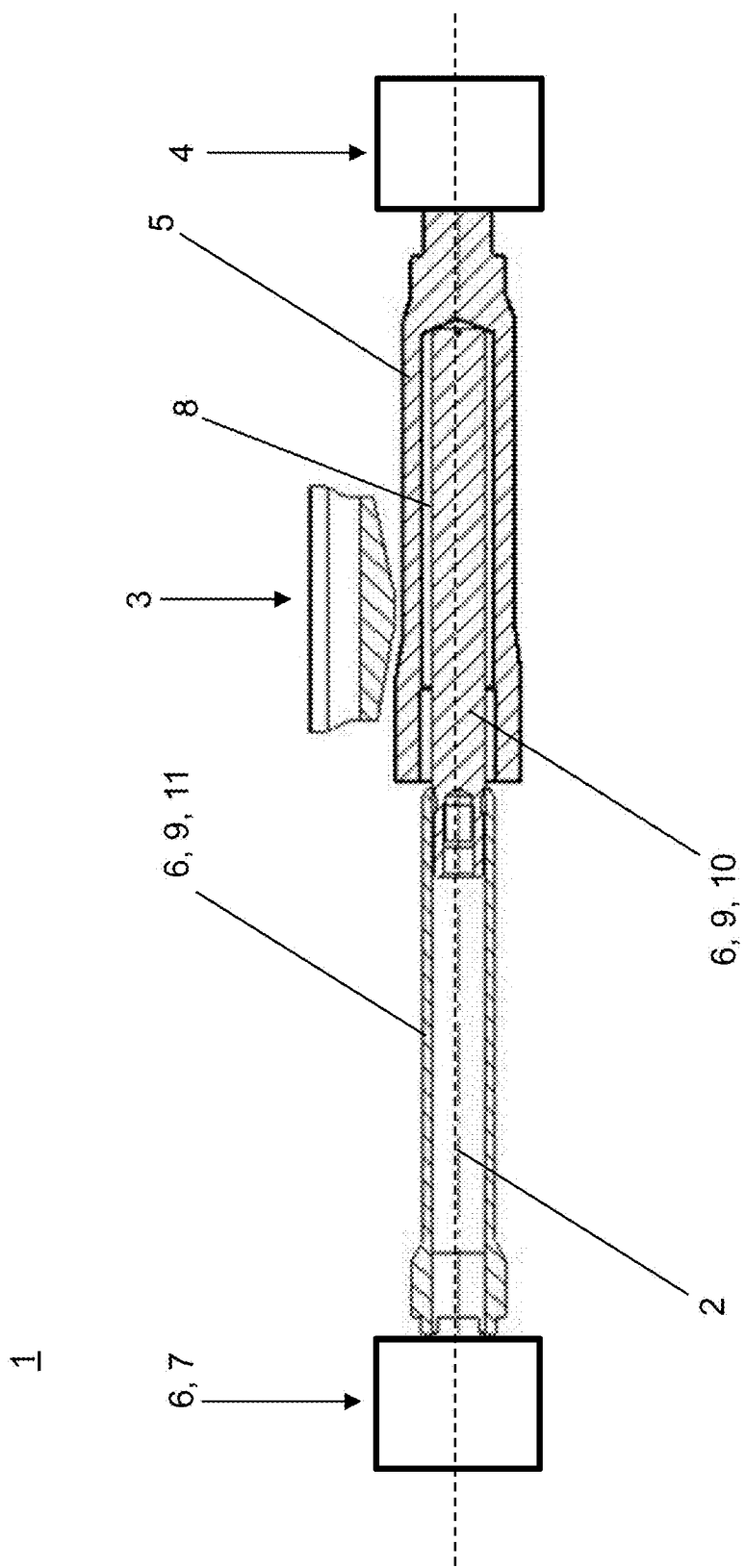
FIG. 6 shows a schematic sectional view of the device between the first forging operation and the second forging operation.
Figure 7:
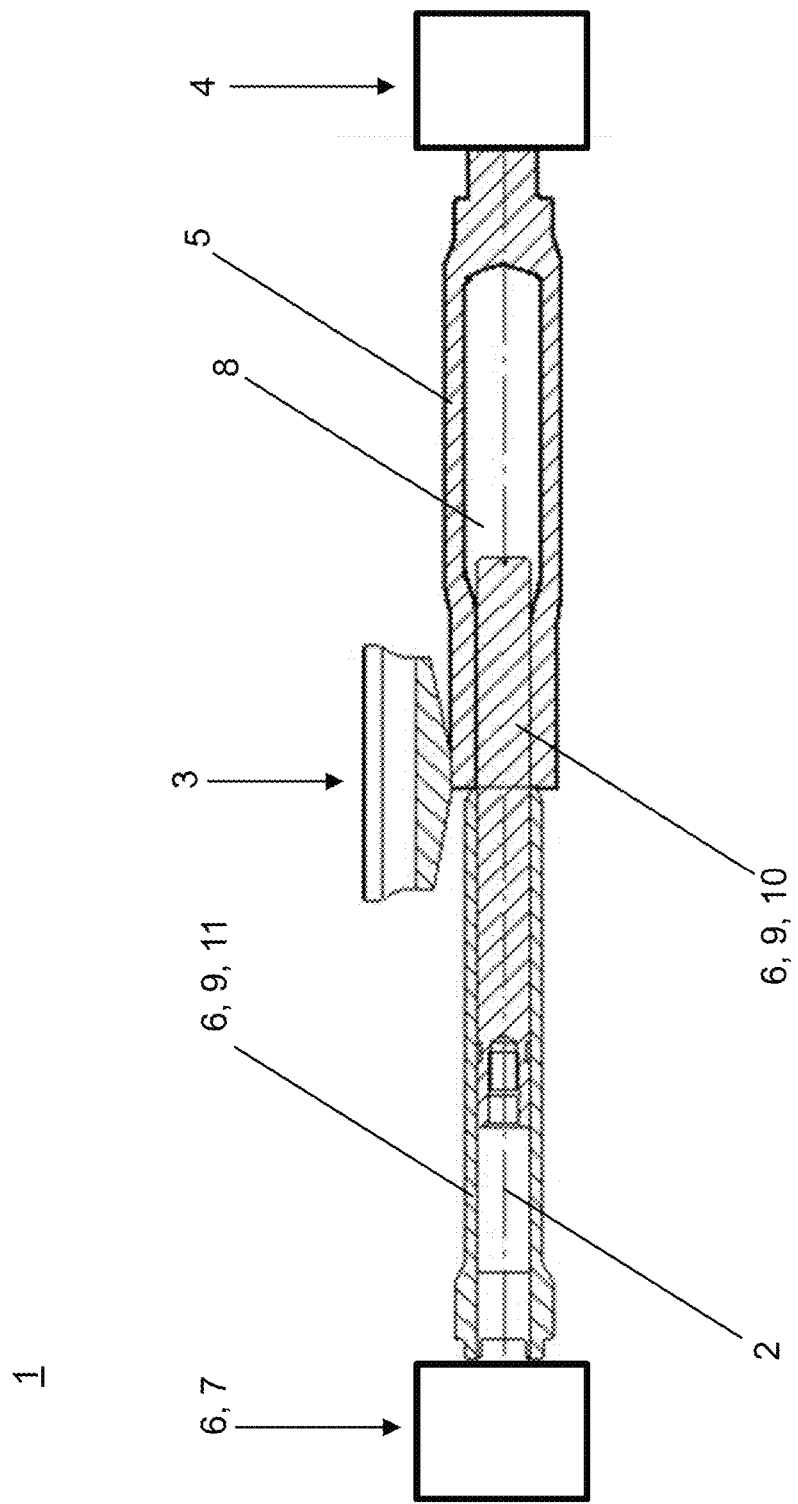
FIG. 7 shows a schematic sectional view of the device during a second forging operation.
Figure 8:
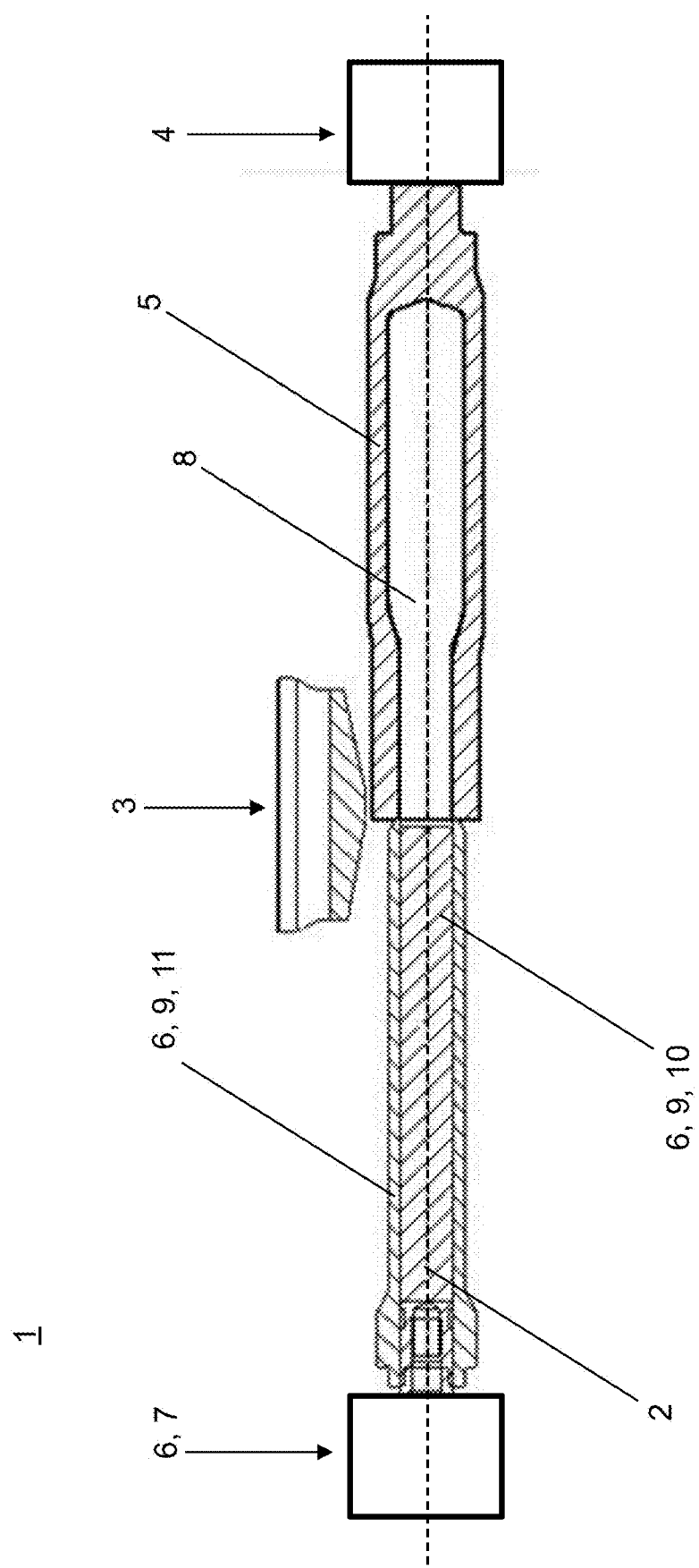
FIG. 8 shows a schematic sectional view of the device after the two forging operations.

FIG. 1 to FIG. 3 each show schematic illustrations of a blank 5 in various forging stages. Thus, FIG. 1 shows a blank 5 prior to the forging operations, FIG. 2 shows a blank 5 after a first forging operation, and FIG. 3 shows a blank 5, now a finished shaft, after a first and second forging operation. FIG. 4 to FIG. 8 each illustrate a device 1 in the corresponding forging stages.

The blank 5 according to FIG. 1 is the starting material for producing a shaft with a varying internal diameter i1, i2 (and a varying external diameter a1, a2) and is cylindrical, partially hollow, and has a central cavity 8. In the present exemplary embodiment, the blank 5 is an extruded blank that is closed on one side. The blank 5 is thus closed on a first end side and open on a second end side that is opposite said first end side, wherein the opening on the second end side is part of the central cavity 8 in the blank 5.

Figure 9:
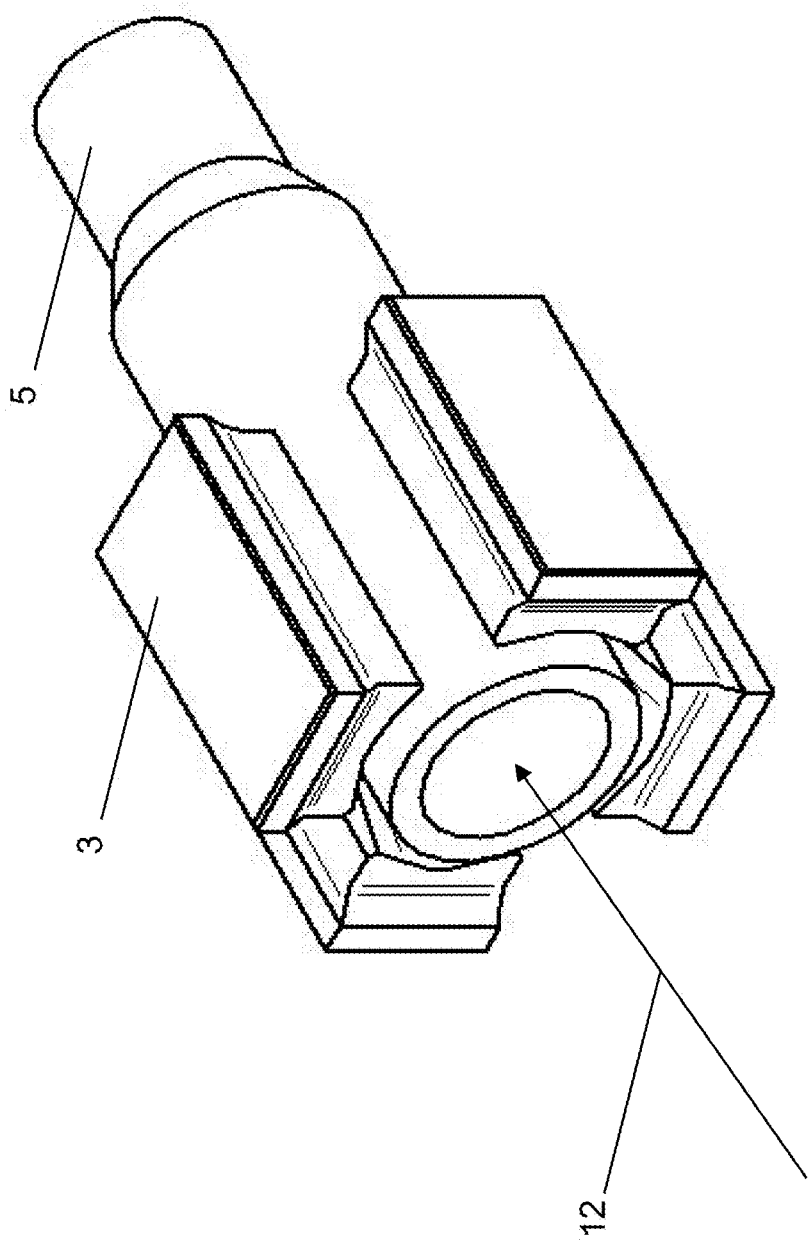
FIG. 9 shows a perspective view of the blank and of the forging tools.
Figure 10:
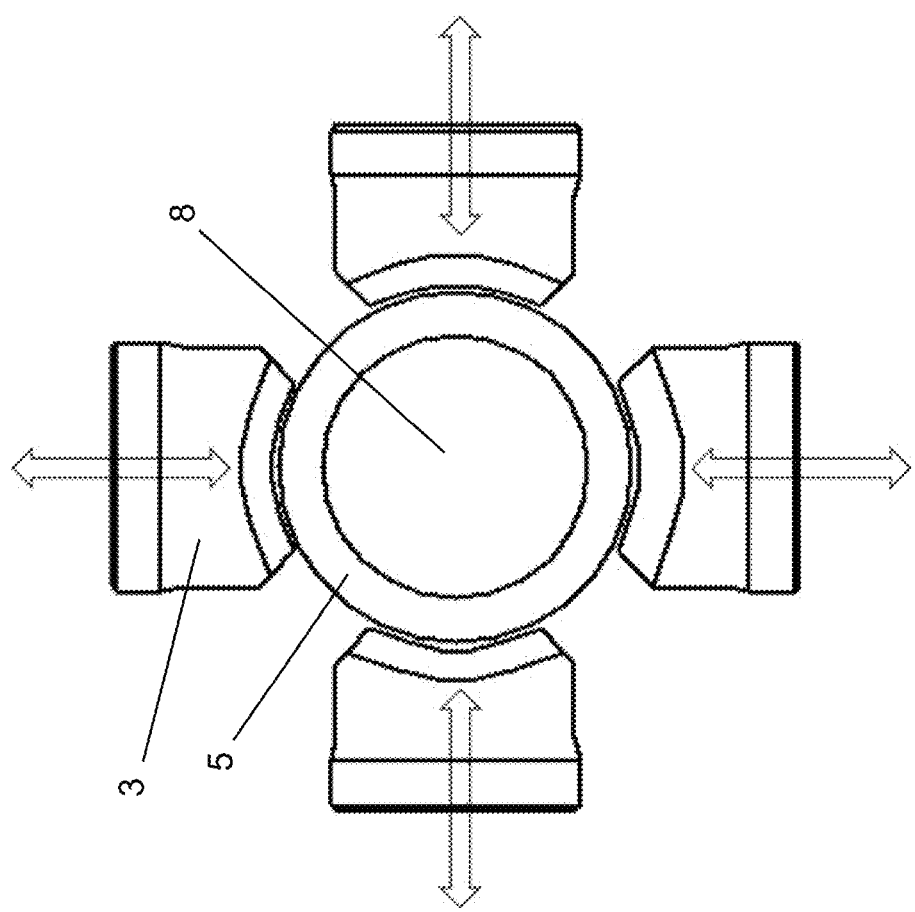
FIG. 10 shows a front view of FIG. 9 in the viewing direction of the directional arrow 12.

The device 1 comprises four forging tools 3, specifically forging hammers, which are arranged centrally symmetrically about a forging axis 2 and can be driven in the sense of radial working strokes. Said forging hammers and the arrangement thereof in relation to the blank 5 are illustrated, in particular, in FIG. 9 and FIG. 10.

The device 1 further comprises a clamping head 4 for holding the blank 5, wherein the closed end side of the blank 5 is held at the clamping head 4.

The device 1 also comprises a counterholder 6 for axially supporting the blank 5, wherein the counterholder 6 has a base 7 and a counterholder mandrel 9, which is placed on the base. The counterholder mandrel 9 is designed so as to be able to partially extend axially into the central cavity 8 in the blank 5.

The counterholder mandrel 9 is designed in two parts, wherein a first part of the counterholder mandrel 9 is an internal part 10 and a second part of the counterholder mandrel 9 is an external part 11 that surrounds the internal part 10.

The external part 11 is designed to be able to move axially relative to the internal part 10.

The internal part 10 thus has a smaller external diameter than the external part 11. The external part 11 thus has a larger external diameter than the internal part 10.

In this context, the directional indication "axially" is understood to mean a direction along or parallel to the forging axis 2. In this context, the directional indication "radially" is understood to mean a direction normal to the forging axis 2.

The counterholder 6 and/or the clamping head 4 are/is able to move axially along a guide bed. The forging tools 3, that is to say the forging hammers, are able to move radially.

The counterholder mandrel 9 of the counterholder 6 has a larger axial extent than the central cavity 8 in the blank 5.

The method according to the present disclosure for the production of an at least partially hollow shaft with different internal diameters i1, i2 and different external diameters a1, a2 takes place using the device 1 described above and comprises at least the following steps of:

providing a cylindrical blank 5 with a bore, which at least partially penetrates into said blank 5 and forms a central cavity 8 in the blank 5 (extruded blank closed on one side: FIG. 1), clamping the blank 5 in a clamping head 4 such that an opening of the central cavity 8 is located on an end side of the blank 5 facing away from the clamping head 4 (FIG. 4), axially moving the clamping head 4 with the clamped blank 5 toward a first position of the blank 5 (FIG. 4), axially advancing a counterholder 6 such that a counterholder mandrel 9, specifically an internal part 10 and an external part 11 of the counterholder mandrel 9, completely axially penetrates into the central cavity 8 in the blank 5 as far as a defined stop, wherein the blank 5 is preloaded by way of the external part 11 (FIG. 4), radially advancing the forging tools 3 toward a first portion of the blank 5 (FIG. 4, FIG. 5), forging a first shaft portion with a first internal diameter i1 in the region of the first portion of the blank 5, wherein the first internal diameter i1 is defined by an external diameter of the external part 11 (FIG. 5), radially opening the forging tools 3 (FIG. 6), axially moving the external part 11 out of the central cavity 8 in the blank 5 in the direction toward the base 7 of the counterholder 6, wherein an end side of the blank 5 is preloaded by way of the external part 11 (FIG. 6), axially moving the clamping head 4 with the clamped blank 5 toward a second position of the blank 5 such that the internal part 10 is located in the region of a second portion of the blank and only partially penetrates into the cavity 8 (FIG. 7), radially advancing the forging tools 3 toward the second portion of the blank 5 (FIG. 7), forging a second shaft portion with a second internal diameter i2 in the region of the second portion of the blank 5, wherein the second internal diameter i2 is defined by an external diameter of the internal part 10 (FIG. 7), radially opening the forging tools 3 (FIG. 8), axially moving the internal part 10 out of the central cavity 8 in the blank 5 in the direction toward the base 7 of the counterholder 6, wherein an end side of the blank 5 is released from the external part 11 (FIG. 8), axially removing the blank 5, now the finished shaft, from the clamping head 4 (FIG. 3).

LIST OF REFERENCE SIGNS

1 Device
2 Forging axis
3 Forging tools
4 Clamping head
5 Blank
6 Counterholder
7 Base
8 Central cavity
9 Counterholder mandrel
10 First part (internal part)
11 Second part (external part)
12 Directional arrow
i1 First internal diameter
i2 Second internal diameter
a1 First external diameter
a2 Second external diameter

What is claimed is:

1. A device for continuous production of an at least partially hollow shaft with a varying internal and/or external diameter, said device comprising:
at least two forging tools, which are arranged symmetrically about a forging axis and which are can be driven in a radial working stroke direction,
a clamping head for holding an at least partially hollow cylindrical blank, and
a counterholder for axially supporting the blank, wherein the counterholder has a base and a counterholder mandrel, which wherein the counterholder mandrel is disposed on the base and configured to extend axially into a central cavity of the blank,
wherein the counterholder mandrel includes at least a first part and a second part, wherein the first part of the counterholder mandrel is an internal part and the second part of the counterholder mandrel is an external part that surrounds the internal part, wherein at least the external part moves axially relative to the internal part.

2. The device as claimed in claim 1,
wherein at least one of the counterholder, the clamping head, or the forging tools moves axially along a guide bed.

3. The device as claimed in claim 1,
wherein the counterholder mandrel has a longer axial length than the central cavity of the blank.

4. The device of claim 1, wherein the internal part moves axially relative to the base.

5. The device of claim 4, wherein the external part and the base move together axially.

6. The device of claim 1, wherein the counterholder mandrel, the base, and the clamping head are axially moveable, and the forging tools are radially moveable.

7. The device of claim 1, wherein the clamping head and the base move axially relative to the forging tools.

8. The device of claim 1, wherein the internal part and the external part are the same length, wherein the internal part is configured to remain fully inserted into the central cavity when the external part is fully disposed outside of the central cavity.

9. The device of claim 1, wherein the base, mandrel, and clamping head are moveable axially in the same direction simultaneously relative to the forging tools.

10. The device of claim 9, wherein the axial movement is performed when the internal part is partly received in the central cavity and the external part is fully outside of the central cavity.

11. A method for continuous production of an at least partially hollow shaft with a varying internal and/or external diameter, said method comprising the steps of:
providing a cylindrical blank having a bore, which at least partially penetrates into said blank and forms a central cavity in the blank,
clamping the blank in a clamping head, such that an opening of the central cavity is located on an end side of the blank facing away from the clamping head,
axially moving the clamping head with the clamped blank toward a first position of the blank such that a first portion of the blank is aligned with radial forging tools that are symmetrically disposed about a forging axis,
axially moving a counterholder or axially moving the clamping head such that a counterholder mandrel of the counterholder axially penetrates into the central cavity in the blank up to a defined stop, wherein the counterholder mandrel has an internal part and an external part and the clamped blank is supported by the external part,
radially advancing the forging tools in a radial working direction toward the first portion of the blank,
forging a first shaft portion with a first internal diameter in a region of the first portion of the blank, wherein the first internal diameter is defined by an external diameter of the external part,
radially opening the forging tools,
axially moving the external part out of the central cavity in the blank in a direction toward a base of the counterholder, wherein an end side of the blank is supported by way of the external part,
axially moving the clamping head with the clamped blank toward a second position of the blank such that the internal part is located in a region of a second portion of the blank and only partially penetrates into the central cavity,
radially advancing the forging tools toward the second portion of the blank, forging a second shaft portion with a second internal diameter in the region of the second portion of the blank, wherein the second internal diameter is defined by an external diameter of the internal part and defining a finished shaft, radially opening the forging tools, axially moving the internal part out of the central cavity in the blank in the direction toward the base of the counterholder, wherein the end side of the blank is released from the external part, axially removing the blank from the clamping head.

12. The method of claim 11, wherein the blank remains clamped in the clamping head between forging the first shaft portion and forging the second shaft portion.

13. The method of claim 11, wherein the internal part moves axially relative to a base of the counterholder.

14. The method of claim 13, wherein the external part and the base move together axially.

15. The method of claim 11, wherein the counterholder mandrel, the base, and the clamping head are axially moveable, and the forging tools are radially moveable.

16. The method of claim 11, wherein the first shaft portion has a larger external diameter than the second shaft portion, and wherein the first shaft portion has a larger internal diameter than the second shaft portion.

17. The method of claim 16, wherein the first shaft portion is disposed axially between the second shaft portion and the clamping head.

18. The method of claim 11, wherein the clamping head and the base move axially relative to the forging tools.

19. The method of claim 11, wherein an annular space is defined between the internal part and an internal diameter of the blank prior to radially forging the second shaft portion.

20. The method of claim 11, wherein the internal part remains fully inserted into the central cavity in the blank when the external part is being moved axially out of the central cavity in the blank.

* * * * *